United States Patent
Harada et al.

(10) Patent No.: US 7,646,534 B2
(45) Date of Patent: Jan. 12, 2010

(54) BOX-TYPE MOTOR-OPERATED MICROSCOPE

(75) Inventors: Mitsuo Harada, Hachioji (JP); Yoshihiro Shimada, Sagamihara (JP)

(73) Assignee: Olympus Corporation, Tokyo (JP)

( * ) Notice: Subject to any disclaimer, the term of this patent is extended or adjusted under 35 U.S.C. 154(b) by 30 days.

(21) Appl. No.: 12/141,368

(22) Filed: Jun. 18, 2008

(65) Prior Publication Data

US 2009/0161205 A1   Jun. 25, 2009

(30) Foreign Application Priority Data

Jun. 20, 2007   (JP) ............................. 2007-162590

(51) Int. Cl.
*G02B 21/06* (2006.01)
(52) U.S. Cl. ...................... 359/381; 359/368
(58) Field of Classification Search ................ 359/368, 359/381, 385, 388; 435/288.7
See application file for complete search history.

(56) References Cited

U.S. PATENT DOCUMENTS

| | | | | |
|---|---|---|---|---|
| 5,675,154 A | * | 10/1997 | Lindsay et al. | 250/442.11 |
| 7,382,531 B2 | * | 6/2008 | Tsuchiya et al. | 359/395 |
| 2005/0282268 A1 | * | 12/2005 | Kagayama | 435/288.7 |
| 2006/0072190 A1 | * | 4/2006 | Okugawa | 359/368 |
| 2006/0119935 A1 | * | 6/2006 | Yamamoto | 359/368 |
| 2006/0141613 A1 | * | 6/2006 | Tsuchiya et al. | 435/288.7 |
| 2007/0065936 A1 | * | 3/2007 | Hasegawa et al. | 435/288.7 |
| 2008/0247038 A1 | * | 10/2008 | Sasaki et al. | 359/395 |
| 2008/0304145 A1 | * | 12/2008 | Hasegawa | 359/383 |
| 2009/0015911 A1 | * | 1/2009 | Matsuo et al. | 359/369 |
| 2009/0046358 A1 | * | 2/2009 | Shimada | 359/381 |

FOREIGN PATENT DOCUMENTS

JP   2003005079   1/2003

* cited by examiner

*Primary Examiner*—Alessandro Amari
*Assistant Examiner*—Mark Consilvio
(74) *Attorney, Agent, or Firm*—Pillsbury Winthrop Shaw Pittman, LLP

(57) ABSTRACT

A box-type motor-operated microscope has a motor-operated microscope section having a transmitting illumination optical system, an electric stage, and an image forming optical system; and a housing. The housing includes a fixed housing and a moving housing. The moving housing is movable parallel to an oblique direction with respect to the fixed housing while holding optical elements arranged above the electric stage so that the specimen vessel placed on the electric stage is made replaceable, the motor-operated microscope section is sealed and light-blocked in cooperation with the fixed housing, and the optical axis of the transmitting illumination optical system is practically aligned with that of the image forming optical system.

15 Claims, 7 Drawing Sheets

BOX-TYPE MOTOR-OPERATED MICROSCOPE

This application claims benefits of Japanese Patent Application No. 2007-162590 filed in Japan on Jun. 20, 2007, the contents of which are incorporated herein by reference.

BACKGROUND OF THE INVENTION

1. Field of the Invention

This invention relates to a box-type motor-operated microscope, such as an optical microscope apparatus, having a housing for blocking light or protecting a specimen environment which is chiefly used for the purpose of the observation and/or measurement of a living specimen such as a cell.

2. Description of Related Art

Optical microscopes are generally used as means for observing living cells, in vivo, such as medium cell specimens, cultured with culture fluid on petri dishes or microplates. In recent years, the optical microscope has been combined with a high-sensitivity image pickup means, such as a cooled CCD camera, so that feeble fluorescent light is detected from the medium cell labeled by fluorescence and is recorded as image data. The fluorescent light from the medium cell labeled by fluorescence is extremely feeble, and in order to detect this feeble fluorescent light with accuracy, the detection of light other than the fluorescent light from the cell, namely, of disturbance light, must be prevented as far as possible. For this, some optical microscope apparatuses commercially available have structures such that the entire inverted microscope is covered with a housing and thereby external light is not detected at least when an image is acquired. As one of such box-type optical microscope apparatuses, an inverted microscope, for example, made by General Electric Healthcare Company, is available.

This optical microscope apparatus covers the entire inverted microscope with a housing and includes an electric stage on which a microplate can be placed and which is controlled by a computer and thereby can be moved in X and Y directions. The housing is partially provided with a door so that the electric stage springs forth from the door to a preset position outside the housing, with the microplate placed on the stage. An operator brings about a state where the electric stage lies at the preset position outside the housing and is capable of replacing or setting the microplate. In accordance with instructions of the operator, the door is such as to open when the electric stage springs forth to the preset position outside the housing and to close when the electric stage is incorporated in the housing. Whereby, the entire inverted microscope can be light-blocked and it becomes possible to protect the specimen environment in combination with a living body holding device such as a temperature controller.

In such a box-type motor-operated microscope, when an observation object is moved from a position outside the box to an observation position inside the box by the electric stage, there is the possibility that foreign matter, such as the hand and finger of the operator, is drawn in error into the box, and thus it becomes necessary to ensure safety.

However, in an upright box-type microscope incorporating an image forming optical system, an observation optical system, and the electric stage in the housing, the safety mechanism of a door section is known (for example, refer to Japanese Patent Kokai No. 2003-5079). The microscope apparatus disclosed in Kokai No. 2003-5079 is provided with a detection means for detecting the presence of the foreign matter in the door section when a supporting bench supporting the observation object is brought into the housing.

However, the present applicant has invented an optical microscope apparatus set forth in the specification of Japanese Patent Application No. 2005-331325, as the box-type motor-operated microscope for the purpose of obviating oversizing of the apparatus and improving the operation accuracy of the stage without enlarging the operation range of the stage. This optical microscope apparatus 101, for example, as shown in FIG. 1, includes an inverted microscope 102 having an electric stage 112 on which a microplate 140 incorporating a specimen A is placed, a transmitting illumination optical system 111, and an image forming optical system 114; and a housing 120 surrounding the inverted microscope 102. The housing 120 is composed of a fixed housing 121 and a moving housing 122 which can be opened and closed with respect to the fixed housing 121. The moving housing 122 is rotatably supported by the fixed housing 121 so as to bring about an opened state shown in FIG. 1 by rotating on a rotary shaft 160 through a rotation mechanism, not shown, like bearings. The housing 120 is such that, in a closed state, external light is blocked and the inverted microscope 102 can be maintained in a light-blocked state. Also, in this figure, reference numeral 113 denotes a reflecting illumination optical system.

Of optical parts constituting the transmitting illumination optical system 111 and the image forming optical system 114, some optical parts arranged above the electric stage 112 are provided to be movable through the moving housing 122. When the moving housing 122 is located at the position of the opened state with respect to the fixed housing 121, these optical parts are removed from the upper position of the electric stage 112, while when it is located at the position of the closed state, the optical axis of the transmitting illumination optical system 111 is practically aligned with that of the image forming optical system 114.

According to the optical microscope apparatus 101 of FIG. 1 constructed as mentioned above, in the case where the microplate 140 incorporating the specimen A on the electric stage 112 is replaced, when the moving housing 122 is opened with respect to the fixed housing 121, some optical parts in the transmitting illumination optical system arranged above the electric stage 112 are removed, together with the moving housing 122, from the upper position of the electric stage 112. Hence, a wide space is ensured above the electric stage 112 and the work of the replacement and fixing of the specimen is facilitated. When the moving housing 122 is closed with respect to the fixed housing 121, the inverted microscope 102 is covered with the housing 120 and is light-blocked, and the optical axis of the optical system located above the electric stage 112 constituting the inverted microscope 102 is practically aligned with that of the optical system located below the electric stage 112, so that it becomes possible to utilize illumination light from the transmitting illumination optical system 111 and to carry out a microscope observation through the image forming optical system 114.

An optical microscope apparatus 201 of another example set forth in the specification of Application No. 2005-331325, as shown in FIGS. 2A and 2B, is constructed so that a housing 220 is provided with a moving housing 222 movable in a horizontal direction through a straight guide, not shown, on a fixed housing 221. Between the fixed housing 221 and the moving housing 222, a click mechanism, not shown, is provided so that the moving housing 222 is capable of maintaining the opened and closed states with respect to the fixed housing 221. In these figures, reference numeral 211 denotes a transmitting illumination optical system; 212, an electric stage; 213, an image forming lens; 214, an image forming optical system; and 219, a condenser lens.

According to the optical microscope apparatus 201 of FIGS. 2A and 2B constructed as mentioned above, when the moving housing 222, as shown in FIG. 2A, is located at the position of the closed state with respect to the fixed housing 221, the optical axis of the condenser lens 219 in the transmitting illumination optical system 211 provided in the moving housing 222 is practically aligned with that of the objective lens 213 and the moving housing 222 is maintained in a fixed state by the operation of the click mechanism at this position, so that a space inside the housing 220 is blocked from the external light. On the other hand, as shown in FIG. 2B, when the moving housing 222 is moved to be in the opened state, optical members arranged above the electric stage 212 in the transmitting illumination optical system 211 are removed together with the moving housing 222. Consequently, a wide space is ensured above the electric stage 112 and the work of the replacement and fixing of the specimen is facilitated.

According to the optical microscope apparatus 201 of FIGS. 2A and 2B, the housing 220 can be opened and closed only by sliding the moving housing 222 in the horizontal direction with respect to the fixed housing 221 and a great force is not needed for manipulation. Hence, there is the advantage that maneuverability is excellent.

According to these optical microscope apparatuses, since there is no need to enlarge the operation range of the electric stage to the exterior of the housing in order to ensure a wide space for the work of the replacement of the specimen above the electric stage, oversizing of the apparatus can be prevented and the operation accuracy of the electric stage can be improved.

SUMMARY OF THE INVENTION

The box-type motor-operated microscope according to the present invention comprises a motor-operated microscope section having at least a transmitting illumination optical system, an electric stage for placing a specimen vessel and moving a desired part in the specimen vessel to an observation position, and an image forming optical system provided with an objective lens and an image forming lens; and a housing incorporating the motor-operated microscope section. In this case, the housing includes a fixed housing and a moving housing and is constructed so that the moving housing is movable parallel to an oblique direction with respect to the fixed housing while holding optical elements arranged above the electric stage, the moving housing is moved parallel to an oblique upward direction by a preset amount and thereby the specimen vessel placed on the electric stage is made replaceable, and the moving housing is moved parallel to an oblique downward direction to abut on the fixed housing and thereby the motor-operated microscope section is sealed and light-blocked in cooperation with the fixed housing and the optical axis of the transmitting illumination optical system is practically aligned with that of the image forming optical system.

In the box-type motor-operated microscope of the present invention, it is desirable to further comprise a stand fixed to the fixed housing, a guide member fixed to one side of the stand at a preset inclination angle with respect to an abutment surface between the fixed housing and the moving housing, and a rail fixed to one inside surface of the moving housing at the preset inclination angle and guidably fitted into the guide member.

In the box-type motor-operated microscope of the present invention, it is desirable to further comprise a motor provided to the stand, a toothed pulley provided to the motor, a timing belt whose both ends are fixed to the moving housing, engaged with the toothed pulley, and idlers fixed to the stand so as to hold an engagement of the toothed pulley with the timing belt.

In the box-type motor-operated microscope of the present invention, it is desirable to further comprise a rolling member provided to the inner surface on the opposite side of the rail in the moving housing and a second rail fixed to a remaining side of the stand at the preset inclination angle, supporting the rolling member.

In the box-type motor-operated microscope of the present invention, it is desirable to further comprise a position holding means for holding the position of the moving housing moved parallel to the oblique direction with respect to the fixed housing.

In the box-type motor-operated microscope of the present invention, it is desirable that a part of the moving housing abutting on the fixed housing is provided with a sponge-like elastic body.

In the box-type motor-operated microscope of the present invention, it is desirable that the fixed housing includes a first fixed housing section and a second fixed housing section provided below the first fixed housing section; the first fixed housing section is constructed with a box-shaped member which houses at least the specimen vessel and the electric stage above optical members including the objective lens, of optical members constituting the image forming optical system and which is provided with a temperature control device for controlling the temperature of a specimen incorporated in the specimen vessel; and the second fixed housing section, in contrast with the first fixed housing section, includes a box-shaped member of the letter L in which one corner is concaved, and is constructed so that partial optical members arranged below the objective lens, of optical members constituting the image forming optical system are housed and a camera for picking up the image of the specimen formed through the image forming optical system can be incorporated to be removable and replaceable in an external part concaved in the shape of the letter L.

In the box-type motor-operated microscope of the present invention, it is desirable that the fixed housing includes a first fixed housing section and a second fixed housing section provided below the first fixed housing section; the first fixed housing section is constructed with a box-shaped member which houses at least the specimen vessel and the electric stage above the image forming lens, of optical members constituting the image forming optical system and which is provided with a temperature control device for controlling the temperature of a specimen incorporated in the specimen vessel; and the second fixed housing section, in contrast with the first fixed housing section, includes a box-shaped member of the letter L in which one corner is concaved, and is constructed so that partial optical members arranged below optical members including the image forming lens, of optical members constituting the image forming optical system are housed and a camera for picking up the image of the specimen formed through the image forming optical system can be incorporated to be removable and replaceable in an external part concaved in the shape of the letter L.

In the box-type motor-operated microscope of the present invention, it is desirable that the microscope section is an inverted microscope including a reflecting illumination optical system that has the objective lens also used in the image forming optical system.

In the box-type motor-operated microscope of the present invention, it is desirable that the moving housing has an opening section through which the position of the specimen vessel on the optical axis of at least the objective lens and surroundings thereof can be recognized with the naked eye from outside the moving housing in a state where the moving housing abuts on the fixed housing, and an opening and closing door opening and closing the opening section.

In the box-type motor-operated microscope of the present invention, it is desirable that the opening section is constructed so that, in a state where the moving housing abuts on the fixed housing, a reagent can be poured, though a pipette from outside the moving housing, on a specimen located on the optical axis of at least the objective lens in the specimen vessel.

In the box-type motor-operated microscope of the present invention, it is desirable that the opening section is provided at a position where an angle made by the pipette with the optical axis of the objective lens can be regulated to 60 degrees or less in a case where the reagent is poured, through the pipette, on a part located on the optical axis of at least the objective lens in the specimen vessel.

In the box-type motor-operated microscope of the present invention, it is desirable that when the opening section is opened through the opening and closing door, a part located on the optical axis of the objective lens in the specimen vessel is irradiated with illumination light through the transmitting illumination optical system.

In the box-type motor-operated microscope of the present invention, it is desirable that the illumination light has a wavelength of at least 650 nm.

In the box-type motor-operated microscope of the present invention, it is desirable that the illumination light is LED light.

According to the present invention, the box-type motor-operated microscope is obtained in which the operation range of the opening and closing member for replacing the specimen vessel is reduced to a minimum so that the compact design of the entire apparatus can be achieved, the observation and/or measurement can be maintained with a high degree of accuracy without causing wear even when the opening and closing operation is repeated, and maneuverability and safety are excellent; in which the change of the observation and/or measurement condition according to the application is facilitated; and in which an instantaneous observation and/or measurement of the change of the specimen due to a manual injection of the reagent and the recognition of an internal operating condition of the microscope are possible.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
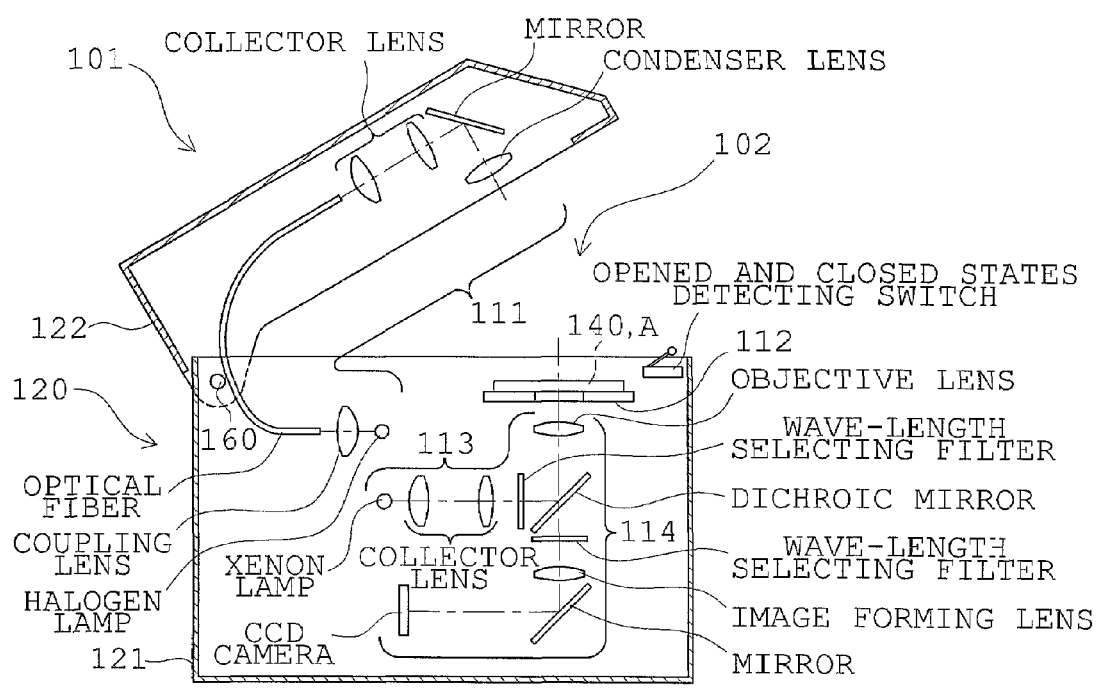
FIG. 1 is a sectional view taken along the optical axis, showing one example of a conventional box-type motor-operated microscope.
Figure 2A:
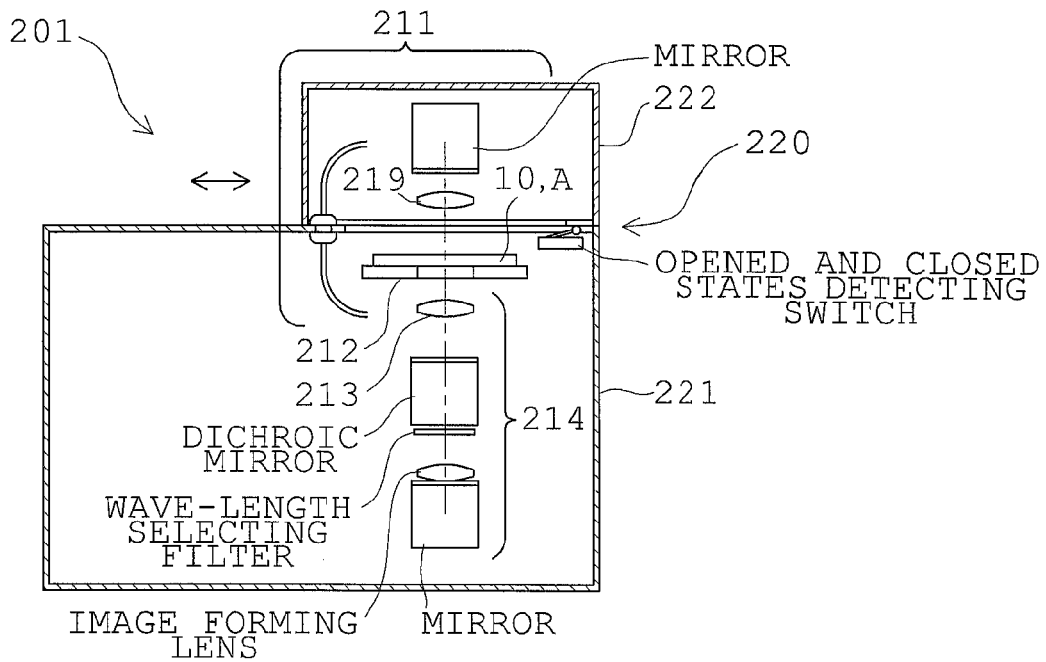
FIGS. 2A and 2B are sectional views taken along the optical axis, showing another example of the conventional box-type motor-operated microscope in states where the moving housing is located at the positions of a closed state and an opened state, respectively.
Figure 2B:
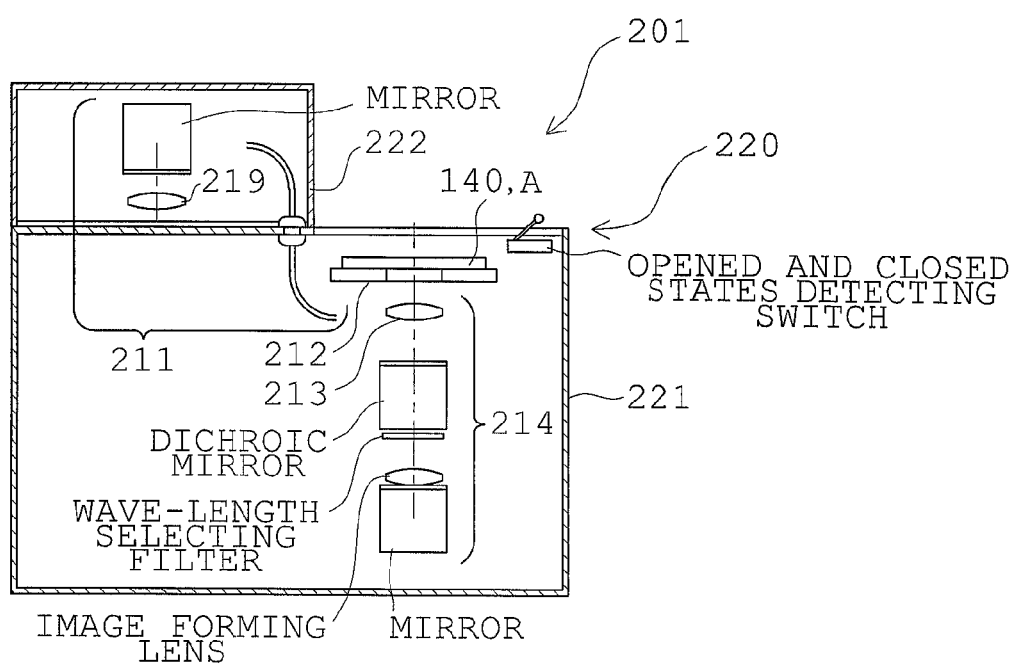

Before undertaking the description of the embodiments, the function and effect of the present invention will be explained.

The box-type motor-operated microscope of the present invention is constructed so that the housing incorporating the motor-operated microscope section includes the fixed housing and the moving housing, the moving housing is movable parallel to an oblique direction with respect to the fixed housing while holding optical elements arranged above the electric stage, the moving housing is moved parallel to an oblique upward direction by a preset amount and thereby the specimen vessel placed on the electric stage is made replaceable, and the moving housing is moved parallel to an oblique downward direction to abut on the fixed housing and thereby the motor-operated microscope section is sealed and light-blocked in cooperation with the fixed housing and the optical axis of the transmitting illumination optical system is practically aligned with that of the image forming optical system.

As mentioned above, when the housing is designed so that the moving housing is moved parallel to the oblique direction with respect to the fixed housing while holding the optical elements arranged above the electric stage, the amount of vertical movement of the moving housing relative to the fixed housing can be limited, so that an operation space is saved as far as possible and the compact design of the entire apparatus can be achieved. At the same time, the wear of a contact surface between the moving housing and the fixed housing can be obviated and the occurrence of a play caused by the repetition of use is prevented as far as possible, so that the interior is kept in favorably sealed and light-blocked states and the observation and/or measurement can be maintained with a high degree of accuracy. Furthermore, since there is little fear of putting an operator's finger between the moving housing and the fixed housing, safety is improved. Also, it is good practice to provide a part of the moving housing abutting on the fixed housing with a sponge-like elastic body. In this way, the safety is further improved and the sealed and light-blocked states can be more favorably kept.

The box-type motor-operated microscope of the present invention is constructed so that the moving housing is moved parallel to an oblique upward direction by a preset amount and thereby the specimen vessel placed on the electric stage is made replaceable, and the moving housing is moved parallel to an oblique downward direction to abut on the fixed housing and thereby the motor-operated microscope section is sealed and light-blocked in cooperation with the fixed housing and the optical axis of the transmitting illumination optical system is practically aligned with that of the image forming optical system.

In this way, the moving housing can be brought to an opened state by a simple operation and thereby the specimen vessel placed on the electric stage can be replaced. Further, after the specimen vessel is removed from the electric stage, the replacement of the objective lens placed below the electric stage and of its correction collar and the injection of immersion oil into the objective lens can be performed. Still further, the moving housing is brought to a closed state by the simple operation and thereby time for the alignment of the optical axis can be saved and a favorable observation and/or measurement state can be maintained.

In the box-type motor-operated microscope of the present invention, it is desirable that the fixed housing includes the first fixed housing section and the second fixed housing section provided below the first fixed housing section; the first fixed housing section is constructed with a box-shaped member which houses at least the specimen vessel and the electric stage above optical members, including the objective lens, constituting the image forming optical system (or above the image forming lens) and which is provided with a temperature control device for controlling the temperature of a specimen incorporated in the specimen vessel; and the second fixed housing section, in contrast with the first fixed housing section, includes a box-shaped member of the letter L in which one corner is concaved, and is constructed so that partial optical members arranged below the objective lens, of optical members constituting the image forming optical system (or below optical members including the image forming lens) are housed and a camera for picking up the image of the specimen formed through the image forming optical system can be incorporated to be removable and replaceable in an external part concaved in the shape of the letter L.

In this way, when the second fixed housing section is configured into the box shape of the letter L so that the camera is mounted to and dismounted from the part concaved into the shape of the letter L and thereby can be incorporated to be replaceable, the camera can easily be replaced from outside the housing according to the application, with the fixed housing maintained in a stable state. In addition, when the camera is mounted, the projection of the camera into the exterior of the fixed housing can be avoided.

When the first fixed housing section is constructed as the box-shaped member provided with a temperature control device, the temperature control can be limited to a necessary range around the specimen and the loss of energy for the temperature control in an unnecessary range can be eliminated.

When the fixed housing is divided into the first fixed housing section and the second fixed housing section, the number of optical members adversely affected by the temperature control can be kept to a minimum even when the temperature control device is provided inside the first fixed housing section.

In the box-type motor-operated microscope of the present invention, it is desirable that the moving housing has an opening section through which the position of the specimen vessel on the optical axis of at least the objective lens and surroundings thereof can be recognized with the naked eye from outside the moving housing in a state where the moving housing abuts on the fixed housing, and an opening and closing door opening and closing the opening section. In addition, it is desirable that the opening section is constructed so that, in a state where the moving housing abuts on the fixed housing, a reagent can be poured, though a pipette from outside the moving housing, on a specimen located on the optical axis of at least the objective lens in the specimen vessel. In this way, the change of the specimen due to the manual injection of the reagent can be observed and/or measured instantaneously, and the operating condition of the electric stage in the interior of the microscope can be recognized.

First Embodiment

Figure 3A:
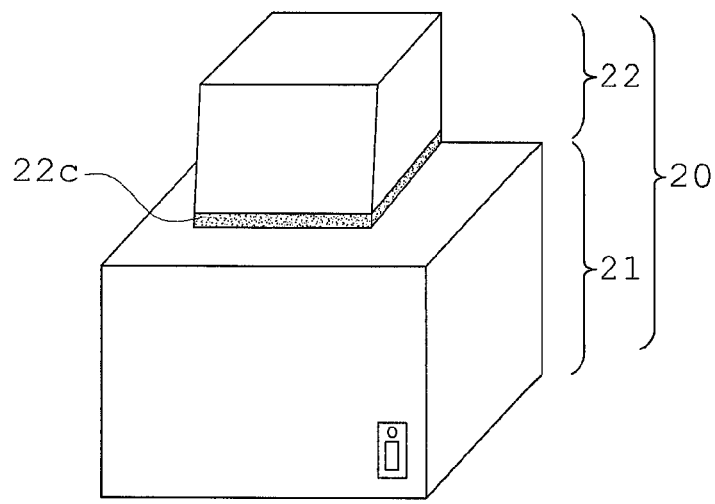
FIGS. 3A and 3B are explanatory views of the box-type motor-operated microscope according to a first embodiment in the present invention, which are a general view looking obliquely from the front, and a side view showing schematically its internal optical arrangement, respectively.
Figure 3B:
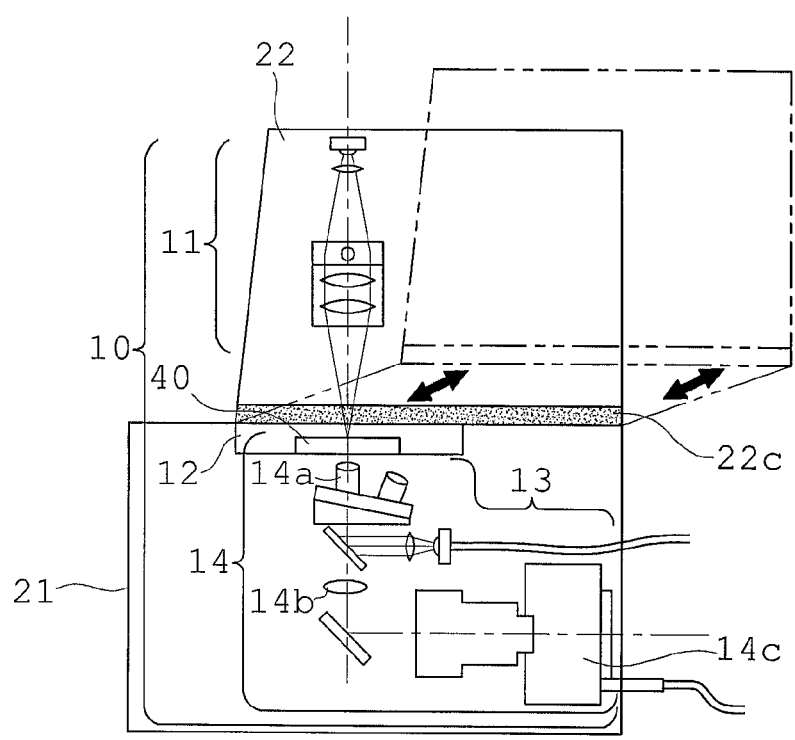
Figure 4:
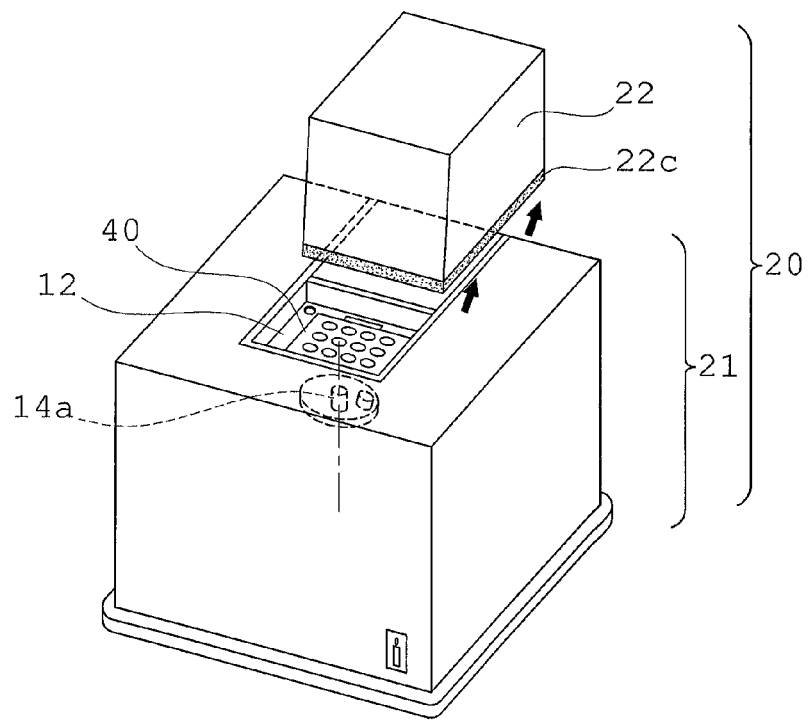
FIG. 4 is a view showing the box-type motor-operated microscope of FIG. 3A brought to the opened state, looking obliquely from the front.
Figure 5A:
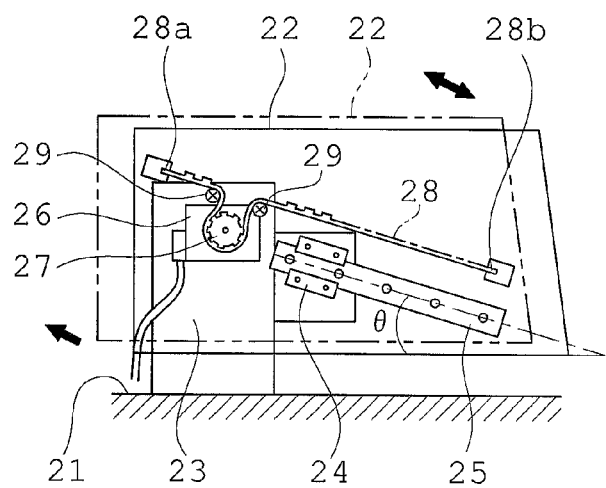
FIGS. 5A and 5B are a side view and a front view, respectively, for explaining a movement mechanism of the moving housing including essential parts in the box-type motor-operated microscope of FIGS. 3A and 3B.
Figure 5B:
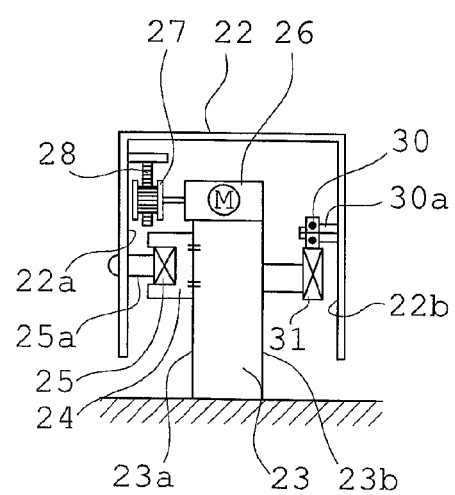

FIGS. 3A and 3B are explanatory views of the box-type motor-operated microscope according to the first embodiment in the present invention, which are a general view looking obliquely from the front, and a side view showing schematically its internal optical arrangement, respectively. FIG. 4 is a view showing the box-type motor-operated microscope of FIGS. 3A and 3B brought to the opened state, looking obliquely from the front. FIGS. 5A and 5B are a side view and a front view, respectively, for explaining the movement mechanism of the moving housing including essential parts in the box-type motor-operated microscope of FIGS. 3A and 3B.

The box-type motor-operated microscope of the first embodiment includes a motor-operated microscope section 10 and a housing 20 incorporating the motor-operated microscope section 10. The motor-operated microscope section 10 has a transmitting illumination optical system 11, an electric stage 12, a reflecting illumination optical system 13, and an image forming optical system 14. The transmitting illumination optical system 11 is placed above the electric stage 12 and is constructed so that a specimen in a specimen vessel 40, for example, consisting of a microplate, placed on the electric stage 12 is irradiated with white light in a vertical direction from above. Also, in a specific optical arrangement of the transmitting illumination optical system 11, any arrangement in which the specimen in the specimen vessel 40 can be irradiated with the white light in a vertical direction from above is applicable.

The electric stage 12 is constructed so that the specimen vessel 40 can be placed thereon. The electric stage 12 is also constructed to be slidable in X and Y directions so that a desired part in the specimen vessel 40 (for example, a desired plate in the microplate) can be moved to an observation position by the control of a computer (not shown) through a driving means (not shown).

The reflecting illumination optical system 13 is placed below the electric stage 12 and is constructed so that the specimen in the specimen vessel 40 placed on the electric stage 12 is irradiated with excitation light in a vertical direction from blow. Also, in a specific optical arrangement of the reflecting illumination optical system 13, any arrangement in which the specimen in the specimen vessel 40 can be irradiated with the excitation light in a vertical direction from below is applicable.

The image forming optical system 14 has an objective lens 14a and an image forming lens 14b. In FIG. 3B, reference numeral 14c represents a camera (for example, a CCD camera) for picking up the image of the specimen formed through the image forming lens 14b. Also, in a specific optical arrangement of the image forming optical system 14, any arrangement in which the objective lens 14a and the image forming lens 14b are provided and the image of the specimen can be formed at a preset image forming position is applicable.

The housing 20 is constructed with a fixed housing 21 and a moving housing 22. The fixed housing 21 is fixedly placed in a state where optical elements, containing the electric stage 12, arranged below the electric stage 12 are held. The moving housing 22 is constructed to be movable parallel to an oblique direction with respect to the fixed housing 21 while holding optical elements (the transmitting illumination optical system 11) arranged above the electric stage 12. The housing 20 is constructed so that the moving housing 22 is moved parallel to an oblique upward direction by a preset amount and thereby the fixed housing 21 is opened and the specimen vessel 40 placed on the electric stage 12 is made replaceable, while the moving housing 22 is moved parallel to an oblique downward direction to abut on the fixed housing 21 and thereby the motor-operated microscope section 10 is sealed and light-blocked in cooperation with the fixed housing 21 and the optical axis of the transmitting illumination optical system 11 is practically aligned with that of the image forming optical system 14.

Here, a specific structure example of the movement mechanism of the moving housing 22 which is favorable for the box-type motor-operated microscope of the first embodiment is shown in FIGS. 5A and 5B. The movement mechanism of the moving housing 22 is constructed to have a stand 23, a guide member 24, a rail 25, a motor 26, a toothed pulley 27, a timing belt 28, and idlers 29.

The stand 23 is fixed to the fixed housing 21. The guide member 24 is constructed with a guide block of U-shaped cross section, for example, of Model No. SHS 15 by THK CO., LTD., and is fixed to one side 23a of the stand 23 through screws at a preset inclination angle θ with respect to an abutment surface between the fixed housing 21 and the moving house 22 (a horizontal surface in FIG. 5A). The rail 25 is fixed to one inside surface 22a of the moving housing 22 through a connecting member 25a at the preset inclination angle θ like the above description and is guidably fitted into the guide member 24. The motor 26 includes a pulse motor, for example, of Model No. PK229 by ORIENTAL MOTOR CO., LTD., and is mounted to the stand 23. The toothed pulley 27 is mounted to the motor 26. The timing belt 28 includes the one, for example, of Model No. HTUN 280 by MISUMI Corporation, and it is fixed to the inside surface 22a of the moving housing 22 with respect to its both ends 28a and 28b at the preset inclination angle θ like the above description and is engaged with the toothed pulley 27. The idlers 29 are fixed to the stand 23 so as to hold the engagement of the toothed pulley 27 with the timing belt 28.

The movement mechanism of the moving housing 22 also has a rolling member 30 and a second rail 31. The rolling member 30 is constructed with rollers that are rotatable on an axis part 30a and is mounted to a remaining inside surface 22b of the moving housing 22. The second rail 31 is fixed to a remaining side 23b of the stand 23 at the preset inclination angle θ like the above description and supports the rolling member 30. In addition, the movement mechanism of the moving housing 22 is provided with a well-known brake member (not shown) as a position holding means for holding the position where the moving housing 22 is moved parallel to the oblique direction with respect to the fixed housing 21.

The box-type motor-operated microscope of the first embodiment provides a part of the moving housing 22 abutting on the fixed housing 21 with a sponge-like elastic body 22c. The sponge-like elastic body 22c is constructed of silicon sponge, for example, of Model No. TL4403 by INOAC CORPORATION.

In the box-type motor-operated microscope of the first embodiment constructed as mentioned above, when an operator manually applies a force to the moving housing 22 in the direction of the opened or closed state, the rail 25 is guided by the guide member 24 so that the moving housing 22 is moved parallel to an axial direction at the preset inclination angle θ with respect to the abutment surface between the fixed housing 21 and the moving house 22. Also, at this time, the timing belt 28 is pulled in a preset direction and the toothed pulley 27 is rotated through the idlers 29.

When the motor 26 is driven, the toothed pulley 27 is rotated in the direction of rotation of the motor and the timing belt 28 is pulled in a preset direction through the idlers 29. Whereby, the rail 25 is guided by the guide member 24 so that the moving housing 22 is moved parallel to the axial direction at the preset inclination angle θ with respect to the abutment surface between the fixed housing 21 and the moving house 22. Also, in accordance with the movement of the moving housing 22, the rolling member 30 is rotated on the second rail 31 and at the same time, the moving housing 22 is moved parallel to the axial direction at the preset inclination angle θ with respect to the abutment surface between the fixed housing 21 and the moving house 22.

For the direction of the opened state, the moving housing 22 can be moved to a preset position where the specimen vessel 40 placed on the electric stage 12 can be replaced. The moving housing 22 moved to this preset position is held by the position holding means. Whereby, the operator is capable of replacing the specimen vessel 40. Alternatively, after the specimen vessel 40 is removed, the objective lens 14a located below the specimen vessel 40 can be replaced with an objective lens of different magnification, or oil for immersion and observation can be poured on the objective lens 14a.

The moving housing 22, when closed, abuts on the fixed housing 21 so that the motor-operated microscope section 10 is sealed and light-blocked in cooperation with the fixed housing 21. Also, in the box-type motor-operated microscope of the first embodiment, since the part of the moving housing 22 contacting with the fixed housing 21 is provided with the sponge-like elastic body 22c, the sponge-like elastic body 22c is elastically deformed and thereby hermeticity relative to contact with the fixed housing 21 is improved. When the moving housing 22 is closed, the optical axis of the transmitting illumination optical system 11 is aligned with that of the image forming optical system 14. Whereby, it becomes possible for the operator to carry out the observation and/or measurement of the specimen.

In the box-type motor-operated microscope of the first embodiment, as mentioned above, the moving housing 22 is moved parallel to the axial direction at the preset inclination angle θ with respect to the abutment surface between the fixed housing 21 and the moving house 22 in the case of either a manual or an electric opening and closing operation. In this way, the moving housing 22 is moved in horizontal and vertical directions at the same time with respect to the fixed housing 21. According to the box-type motor-operated microscope of the first embodiment, therefore, the amount of vertical movement of the moving housing 22 relative to the fixed housing 21 can be limited and an operation space is saved as far as possible so that a compact design of the entire apparatus can be achieved. At the same time, the wear of the contact surface between the moving housing 22 and the fixed housing 21 that occurs when the housing is opened and closed can be obviated and the occurrence of a play of the contact surface between the moving housing 22 and the fixed housing 21 caused by the repetition of use is prevented as far as possible, so that the interior is kept in favorably sealed and light-blocked states and the observation and/or measurement can be maintained with a high degree of accuracy.

As a result of the fact that the amount of vertical movement of the moving housing 22 relative to the fixed housing 21 can be limited, there is little fear of putting the hand and finger between the moving housing 22 and the fixed housing 21, safety is improved. Moreover, the part of the moving housing 22 abutting on the fixed housing 21 is provided with the sponge-like elastic body 22c, and thus even though the hand and finger touch in error on the housing in the closing operation of the moving housing 22, the sponge-like elastic body 22c functions as a shock absorbing member and thereby safety is further improved. At the same time, when the moving housing 22 is made to abut on the fixed housing 21, the sponge-like elastic body 22c is elastically deformed and thereby the sealed and light-blocked states of the interior can be more favorably maintained. In addition, since the sponge-like elastic body 22c is constructed of silicon sponge, durability is excellent and the maintenance cost of the moving housing 22 can be reduced accordingly.

According to the box-type motor-operated microscope of the first embodiment, the rolling member 30 is mounted to the inside surface 22b on the opposite side of the rail 25 in the moving housing 22, and the second rail 31 supporting the rolling member 30 is fixed to the remaining side 23b of the stand 23 at the preset inclination angle θ like the above description. Hence, the loads of weights of the moving housing 22 and optical members held inside the moving housing 22 can be shifted to the rolling member 30 and the second rail 31 in addition to the rail 25 and the guide member 24. As a result, the parallel movement of the moving housing 22 can be further stabilized.

Also, although the movement mechanism of the moving housing 22 shown in FIGS. 5A and 5B is constructed so that electric driving means, such as the motor 26, the pulley 27, the timing belt 28, and the idlers 29, are provided and thereby the moving housing 22 can be electrically driven, it may be constructed so that the moving housing 22 is driven only by the manual operation without providing such electric driving means. Further, the box-type motor-operated microscope of the first embodiment is such that the motor-operated microscope section 10 has the reflecting illumination optical system 13, but it is also applicable to an arrangement excluding the reflecting illumination optical system 13.

Second Embodiment

Figure 6A:
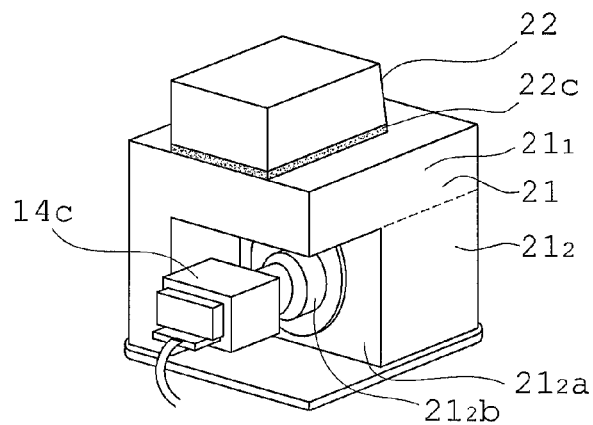
FIGS. 6A, 6B, 6C, and 6D are explanatory views showing structures of essential parts of the box-type motor-operated microscope according to a second embodiment in the pre-sent invention, which are a perspective view looking obliquely from the right side back, a rear view, a left-side view, and a sectional view taken along line A-A in FIG. 6C, respectively.
Figure 6B:
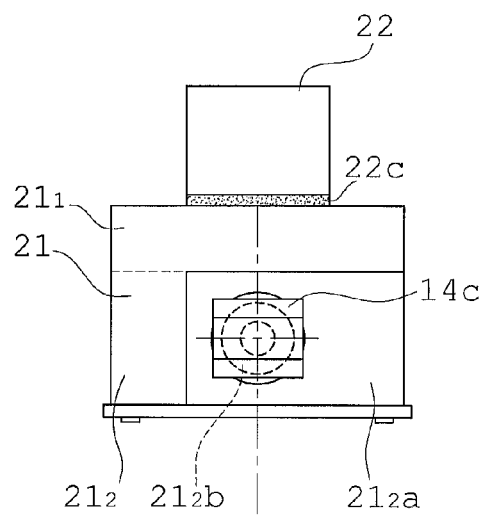
Figure 6C:
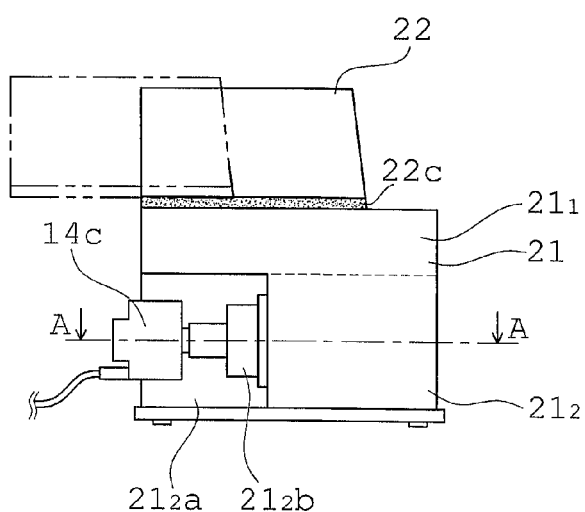
Figure 6D:
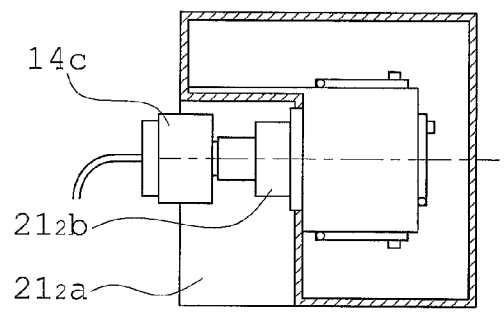
Figure 7:
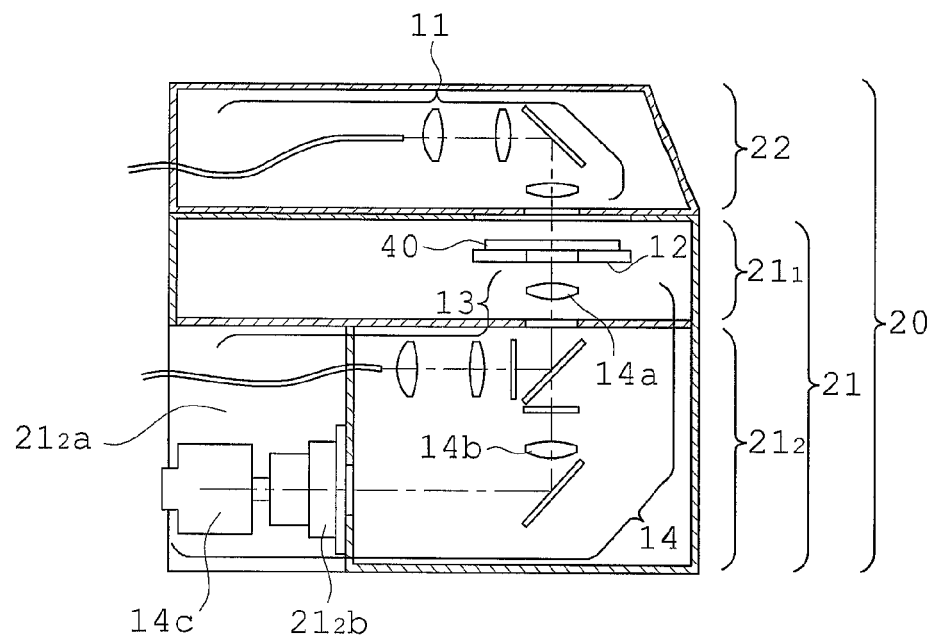
FIG. 7 is a sectional view taken along the optical axis of the box-type motor-operated microscope shown in FIG. 6C.

FIGS. 6A, 6B, 6C, and 6D are explanatory views showing structures of essential parts of the box-type motor-operated microscope according to the second embodiment in the present invention, which are a perspective view looking obliquely from the right side back, a rear view, a left-side view, and a sectional view taken along line A-A in FIG. 6C, respectively. FIG. 7 is a sectional view taken along the optical axis of the box-type motor-operated microscope shown in FIG. 6C. Also, like reference numerals are used for like optical members with respect to the structure substantial to the box-type motor-operated microscope of the first embodiment and their specific explanation is omitted.

In the box-type motor-operated microscope of the second embodiment, besides the structure of the box-type motor-operated microscope of the first embodiment, the fixed housing 21 includes a first fixed housing section $21_1$ and a second fixed housing section $21_2$ provided below the first fixed housing section $21_1$. The first fixed housing section $21_1$, as shown in FIG. 7, is constructed with a box-shaped member which houses the objective lens 14a, the specimen vessel 40, and the electric stage 12 and which is provided with a well-known temperature control device (not shown) for controlling the temperature of the specimen incorporated in the specimen vessel 40. The second fixed housing section $21_2$, in contrast with the first fixed housing section $21_1$, is constructed with a box-shaped member of the letter L in which one corner is concaved.

The second fixed housing section $21_2$ is constructed so that optical members excluding a camera 14c, arranged below the objective lens 14a, of optical members constituting the reflecting illumination optical system 13 and the image forming optical system 14 are housed and the camera 14c can be incorporated to be removable and replaceable in an external part $21_2$a concaved in the shape of the letter L. In these figures, reference numeral $21_2$b denotes the mounting portion of the camera 14c. Other features are almost the same as in the box-type motor-operated microscope of the first embodiment.

According to the box-type motor-operated microscope of the second embodiment constructed as mentioned above, the second fixed housing section $21_2$ is configured into a box shape of the letter L and is constructed so that the camera 14c can be incorporated to be removable and replaceable in the part $21_2$a concaved in the shape of the letter L, and hence the camera 14c can easily be replaced from outside the housing in accordance with the application while the fixed housing 21 is maintained in a stable state. In addition, when the camera 14c is mounted, the projection of the camera 14c into the exterior of the fixed housing 21 can be avoided.

Since the first fixed housing section $21_1$ is constructed as the box-shaped member provided with the temperature control device, the temperature control can be limited to a necessary range around the specimen and the loss of energy for the temperature control in an unnecessary range can be eliminated. Moreover, since the fixed housing 21 is divided into the first fixed housing section $21_1$ and the second fixed housing section $21_2$, the number of optical members adversely affected by the temperature control can be kept to a minimum even when the temperature control device is provided inside the first fixed housing section $21_1$.

Also, although in FIG. 7 the box-type motor-operated microscope of the second embodiment is designed so that the motor-operated microscope section 10 has the reflecting illumination optical system 13, it is also applicable to an arrangement excluding the reflecting illumination optical system 13. In this case, for example, the first fixed housing section $21_1$ is constructed with a box-shaped member which houses at least the specimen vessel 40 and the electric stage 12, above the image forming lens 14b, of optical members constituting the image forming optical system 14 and which is provided with the temperature control device for controlling the temperature of the specimen incorporated in the specimen vessel 40. The second fixed housing section $21_2$, in contrast with the first fixed housing section $21_1$, is constructed with a box-shaped member of the letter L in which one corner is concaved, and can be designed so that partial optical members arranged below optical members including the image forming lens 14b, of optical members constituting the image forming optical system 14 are housed and the camera 14c for picking up the image of the specimen formed through the image forming lens 14b can be incorporated to be removable and replaceable in the external part $21_2$a concaved in the shape of the letter L. In this way, the same effect as in the box-type motor-operated microscope constructed as shown in FIG. 7 is brought about.

Other functions and effects are almost the same as in the box-type motor-operated microscope of the first embodiment.

Third Embodiment

Figure 8:
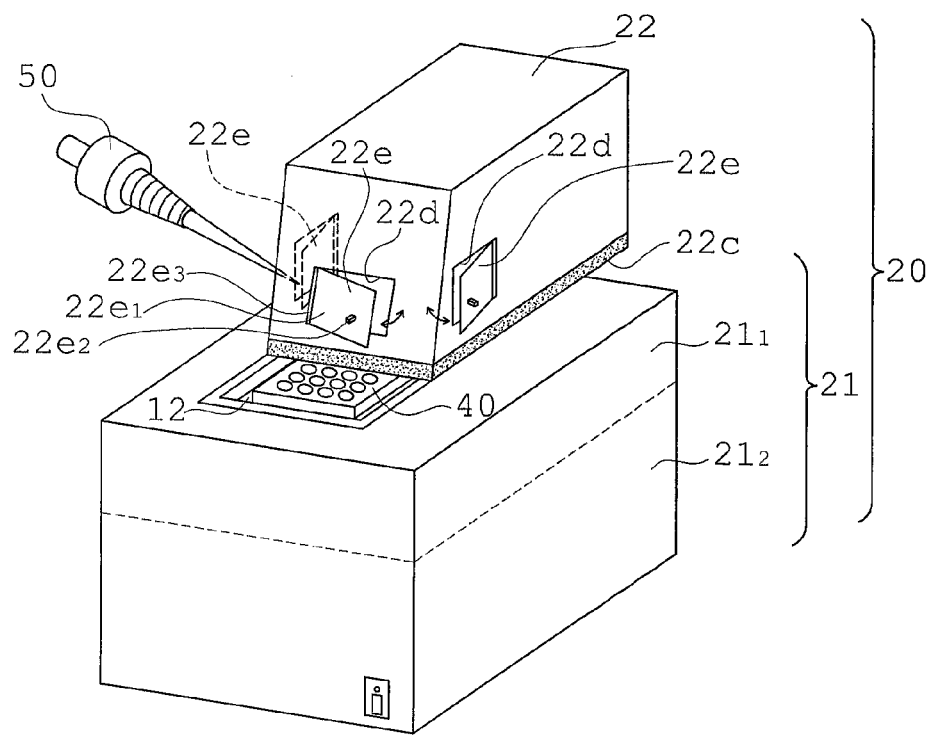
FIG. 8 is an explanatory view chiefly showing the structure of the moving housing constituting essential parts of the box-type motor-operated microscope according to a third embodiment in the present invention.
Figure 9:
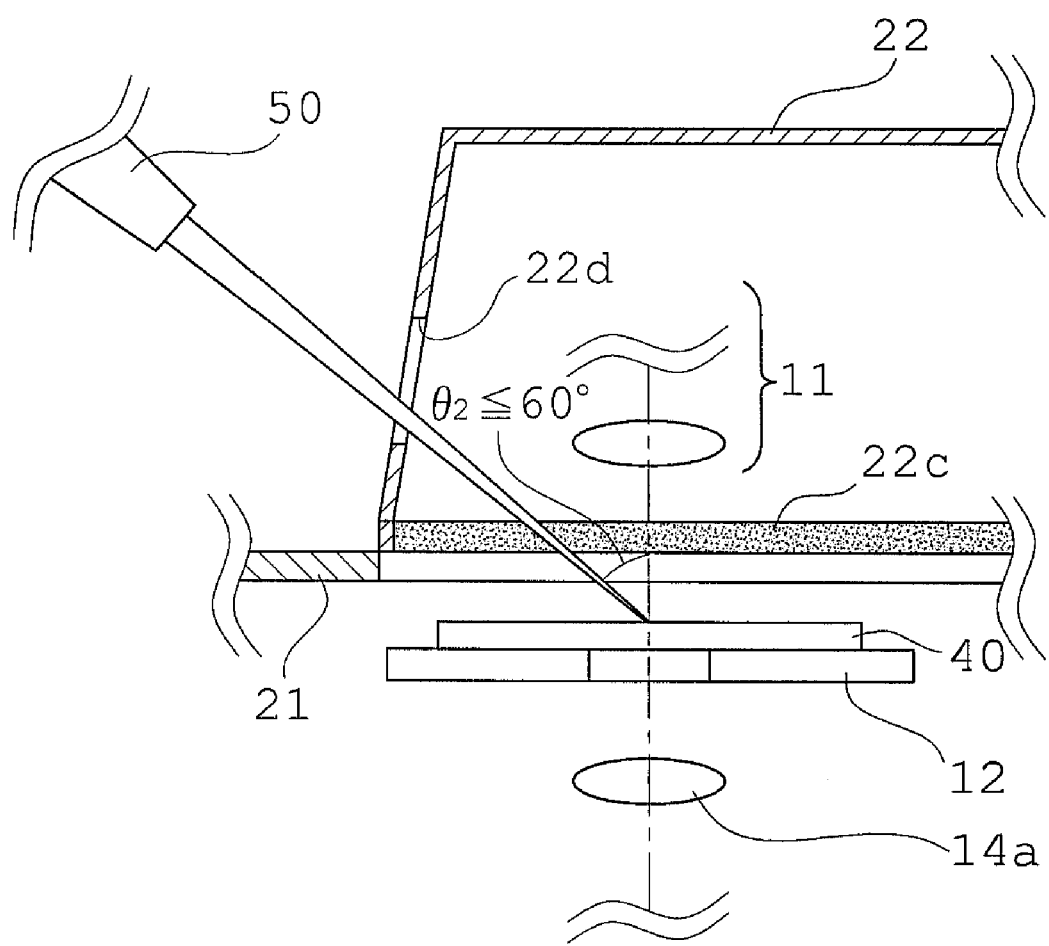
FIG. 9 is an explanatory view showing a state where a reagent is poured, from a pipette, on the specimen in the specimen vessel through an opening and closing window in the box-type motor-operated microscope of FIG. 8.

FIG. 8 is an explanatory view chiefly showing the structure of the moving housing constituting essential parts of the box-type motor-operated microscope according to the third embodiment in the present invention. FIG. 9 is an explanatory view showing a state where a reagent is poured, from a pipette, on the specimen in the specimen vessel through an opening and closing window in the box-type motor-operated microscope of FIG. 8.

In the box-type motor-operated microscope of the third embodiment, the moving housing 22 has opening sections 22d through which the position of the specimen vessel 40 on the optical axis of the objective lens and surroundings thereof can be recognized with the naked eye from outside the moving housing 22 in a state where the moving housing 22 abuts on the fixed housing 21, and opening and closing doors 22e opening and closing the opening sections 22d at three places of the front and both sides of the moving housing 22. Also, the opening section 22d and the opening and closing door 22e may, of course, be provided at a single place. The opening and closing door 22e has a door body $22e_1$, a knob $22e_2$, and a hinge $22e_3$ and is constructed so that the operator rotates the door body $22e_1$, with the hinge $22e_3$ as an axis, with respect to the body of the moving housing 22 while holding the knob $22e_2$ and thereby is capable of opening and closing the opening section 22d.

The opening section 22d has a size and is provided at a position such that a reagent can be poured, through a pipette 50 from outside the moving housing 22, on the specimen located on the optical axis of at least the objective lens 14a in the specimen vessel 40 in a state where the moving housing 22 abuts on the fixed housing 21. The opening section 22d, as illustrated in FIG. 9, is provided at a position where an angle made by the pipette 50 with the optical axis of the objective lens 14a can be regulated to 60 degrees or less in a case where the reagent is poured, through the pipette 50, on a part located on the optical axis of at least the objective lens 14a in the specimen vessel 40.

In addition, the opening and closing door 22e is designed to function as a switch turning on or off an illumination light source, omitted from the figures, provided in the transmitting illumination optical system 11. The box-type motor-operated microscope of the third embodiment is such that when the opening section 22d is opened through the opening and closing door 22e, a part located on the optical axis of the objective lens 14a in the specimen vessel 40 is irradiated with illumination light through the transmitting illumination optical system 11. Also, the illumination light is LED light with a wavelength of 650 nm or more. Other features are almost the same as in the box-type motor-operated microscope of the first embodiment.

In the box-type motor-operated microscope of the third embodiment constructed as described above, the opening and closing door 22e is opened in a state where the moving housing 22 abuts on the fixed housing 21, and thereby the position of the specimen vessel 40 on the optical axis of at least the objective lens 14a and surroundings thereof can be recognized with the naked eye through the opening section 22d. The pipette 50 is inserted into the opening section 22 and the reagent can be poured on the specimen located on the optical axis of the objective lens 14a.

When the reagent is poured on a part of the specimen located on the optical axis of the objective lens 14a through the pipette 50 from the opening section 22d, the angle made by the pipette 50 with the optical axis of the objective lens 14a can be regulated to 60 degrees or less. In this way, it becomes easy to pour the reagent while recognizing the position of the specimen vessel 40 on the optical axis of the objective lens 14a and surroundings thereof with the naked eye. In addition, the operating condition of the electric stage 12 can also be recognized through the opening section 22d.

Moreover, when the opening section 22d is opened through the opening and closing door 22e, the part of the specimen vessel 40 located on the optical axis of the objective lens 14a is irradiated with illumination light through the transmitting illumination optical system 11, and therefore, even when the box-type motor-operated microscope is placed in an ambience that the amount of light is very small, such as a darkroom, the position of the specimen vessel 40 on the optical axis of the objective lens 14a and the surroundings can be recognized with the naked eye. At the same time, the reagent can be manually poured through the pipette 50 and the operating condition of the electric stage 12 can be recognized with the naked eye. Also, when the opening and closing door 22e is closed, the interior of the housing 20 is sealed and light-blocked. Whereby, it becomes possible that illumination light is used to carry out the observation and/or measurement of the specimen located on an optical axis for observation through the reflecting illumination optical system 13.

According to the box-type motor-operated microscope of the third embodiment, as mentioned above, the surroundings of the specimen on the optical axis of the objective lens 14a can be observed with the naked eye by the opening operation of the opening and closing door 22d. Consequently, the change of the specimen due to the manual injection of the reagent can be observed and/or measured instantaneously, and the operating condition of the electric stage 12 in the interior of the microscope can be recognized. Other functions and effects are almost the same as in the box-type motor-operated microscope of the first embodiment.

The present invention is useful in the fields of medical treatment, medical science, and biology in which living specimens, such as cells, are observed and/or measured.

What is claimed is:
1. A box-type motor-operated microscope comprising:
a motor-operated microscope section having at least:
  a transmitting illumination optical system;
  an electric stage for placing a specimen vessel and moving a desired part in the specimen vessel to an observation position; and
  an image forming optical system provided with an objective lens and an image forming lens; and
a housing incorporating the motor-operated microscope section,
wherein the housing includes a fixed housing and a moving housing and is constructed so that the moving housing is movable parallel to an oblique direction with respect to the fixed housing while holding optical elements arranged above the electric stage, the moving housing is moved parallel to an oblique upward direction by a preset amount and thereby the specimen vessel placed on the electric stage is made replaceable, and the moving housing is moved parallel to an oblique downward direction to abut on the fixed housing and thereby the motor-operated microscope section is sealed and light-blocked in cooperation with the fixed housing and an optical axis of the transmitting illumination optical system is practically aligned with an optical axis of the image forming optical system.

2. A box-type motor-operated microscope according to claim 1, further comprising a stand fixed to the fixed housing, a guide member fixed to one side of the stand at a preset inclination angle with respect to an abutment surface between the fixed housing and the moving housing, and a rail fixed to one inside surface of the moving housing at the preset inclination angle and guidably fitted into the guide member.

3. A box-type motor-operated microscope according to claim 2, further comprising a motor provided to the stand, a toothed pulley provided to the motor, a timing belt whose both ends are fixed to the moving housing, engaged with the toothed pulley, and idlers fixed to the stand so as to hold an engagement of the toothed pulley with the timing belt.

4. A box-type motor-operated microscope according to claim 2 or 3, further comprising a rolling member provided to an inside surface on an opposite side of the rail in the moving housing and a second rail fixed to a remaining side of the stand at the preset inclination angle, supporting the rolling member.

5. A box-type motor-operated microscope according to claim 1, further comprising position holding means for holding a position of the moving housing moved parallel to the oblique direction with respect to the fixed housing.

6. A box-type motor-operated microscope according to claim 1, wherein a part of the moving housing abutting on the fixed housing is provided with a sponge-like elastic body.

7. A box-type motor-operated microscope according to claim 1, wherein the fixed housing includes a first fixed housing section and a second fixed housing section provided below the first fixed housing section; the first fixed housing section is constructed with a box-shaped member which houses at least the specimen vessel and the electric stage above optical members including the objective lens, of optical members constituting the image forming optical system and which is provided with a temperature control device for controlling a temperature of a specimen incorporated in the specimen vessel; and the second fixed housing section, in contrast with the first fixed housing section, includes a box-shaped member of a letter L in which one corner is concaved, and is constructed so that partial optical members arranged below the objective lens, of optical members constituting the image forming optical system are housed and a camera for picking up an image of the specimen formed through the image forming optical system can be incorporated to be removable and replaceable in an external part concaved in the shape of the letter L.

8. A box-type motor-operated microscope according to claim 1, wherein the fixed housing includes a first fixed housing section and a second fixed housing section provided below the first fixed housing section; the first fixed housing section is constructed with a box-shaped member which houses at least the specimen vessel and the electric stage above the image forming lens, of optical members constituting the image forming optical system and which is provided with a temperature control device for controlling a temperature of a specimen incorporated in the specimen vessel; and the second fixed housing section, in contrast with the first fixed housing section, includes a box-shaped member of a letter L in which one corner is concaved, and is constructed so that partial optical members arranged below optical members including the image forming lens, of optical members constituting the image forming optical system are housed and a camera for picking up an image of the specimen formed through the image forming optical system can be incorporated to be removable and replaceable in an external part concaved in the shape of the letter L.

9. A box-type motor-operated microscope according to claim 1, wherein the microscope section is an inverted microscope including a reflecting illumination optical system that has the objective lens also used in the image forming optical system.

10. A box-type motor-operated microscope according to claim 1, wherein the moving housing has an opening section through which a position of the specimen vessel on an optical axis of at least the objective lens and surroundings thereof can be recognized with a naked eye from outside the moving housing in a state where the moving housing abuts on the fixed housing, and an opening and closing door opening and closing the opening section.

11. A box-type motor-operated microscope according to claim 10, wherein the opening section is constructed so that, in a state where the moving housing abuts on the fixed housing, a reagent can be poured, though a pipette from outside the moving housing, on a specimen located on the optical axis of at least the objective lens in the specimen vessel.

12. A the box-type motor-operated microscope according to claim 11, wherein the opening section is provided at a position where an angle made by the pipette with the optical axis of the objective lens can be regulated to 60 degrees or less in a case where the reagent is poured, through the pipette, on a part located on the optical axis of at least the objective lens in the specimen vessel.

13. A box-type motor-operated microscope according to claim 10, wherein when the opening section is opened through the opening and closing door, a part located on the optical axis of the objective lens in the specimen vessel is irradiated with illumination light through the transmitting illumination optical system.

14. A box-type motor-operated microscope according to claim 13, wherein the illumination light has a wavelength of at least 650 nm.

15. A box-type motor-operated microscope according to claim 14, wherein the illumination light is LED light.

* * * * *